(12) United States Patent
McClosky

(10) Patent No.: US 6,193,621 B1
(45) Date of Patent: Feb. 27, 2001

(54) TAKE-UP DEVICE FOR TENSIONING MOTION TRANSMITTING CONTROL CABLES

(75) Inventor: Stan H. McClosky, Rochester Hills, MI (US)

(73) Assignee: Fanuc Robotics North America, Inc., Rochester Hills, MI (US)

(*) Notice: Subject to any disclaimer, the term of this patent is extended or adjusted under 35 U.S.C. 154(b) by 0 days.

(21) Appl. No.: 09/306,554

(22) Filed: May 6, 1999

(51) Int. Cl.[7] ................................. F16H 7/08; F16C 1/22
(52) U.S. Cl. ...................... 474/101; 474/255; 74/501.5 R
(58) Field of Search ........................... 474/253, 255, 474/256, 257, 109, 150, 101, 102, 148; 403/229; 74/89.2, 89.21, 89.22, 89.1, 110, 501.5 R

(56) References Cited

U.S. PATENT DOCUMENTS

| | | |
|---|---|---|
| 4,051,742 | 10/1977 | Johansson et al. . |
| 4,229,138 | 10/1980 | Hurst . |
| 4,344,518 | 8/1982 | Gilmore . |
| 4,378,713 | 4/1983 | Haskell et al. . |
| 4,543,849 | 10/1985 | Yamamoto et al. . |
| 4,631,955 | 12/1986 | Brolin et al. . |
| 4,653,364 | 3/1987 | Hansen . |
| 4,682,760 | 7/1987 | Baumgarten . |
| 4,693,137 | 9/1987 | Deligny . |
| 4,753,123 | 6/1988 | Stormont . |
| 4,787,263 | 11/1988 | Jaksic . |
| 4,798,100 | 1/1989 | Baumgarten . |
| 4,813,304 | 3/1989 | Kobayashi . |
| 4,892,004 | 1/1990 | Segura et al. . |
| 5,138,897 | 8/1992 | Beard et al. . |
| 5,156,064 | 10/1992 | Truman . |
| 5,377,556 | 1/1995 | Byrnes . |
| 5,415,057 | 5/1995 | Nihei et al. . |
| 5,435,202 | 7/1995 | Kitamura . |
| 5,485,762 | 1/1996 | Rothman . |
| 5,555,769 | 9/1996 | Lichtenberg . |
| 5,664,461 | 9/1997 | Kitamura . |
| 5,706,706 | 1/1998 | Kitamura . |
| 5,813,290 | 9/1998 | Takahashi et al. . |
| 5,846,151 | * 12/1998 | Hormann ............................ 474/253 |
| 5,902,201 | * 5/1999 | Vermeer et ........................... 474/150 |

* cited by examiner

Primary Examiner—Thomas R. Hannon
(74) Attorney, Agent, or Firm—Howard & Howard

(57) ABSTRACT

A take-up device for automatically taking-up slack in a control cable. The take-up device includes a cable mount mounted to one end of a control cable. A compression spring engages the cable mount and continuously biases the cable mount to a slack take-up position to tension the control cable. In the preferred embodiment, the cable mount is biased so that one end of the control cable moves toward the other end of the control cable in order tension the control cable. A threaded tube engages the cable mount to retain the cable mount in the slack take-up position. The take-up device is characterized by a torsion spring automatically moving the threaded tube into engagement with the cable mount as the compression spring biases the cable mount to the slack take-up position thereby automatically preventing the cable mount from returning to a slackened position.

36 Claims, 4 Drawing Sheets

TAKE-UP DEVICE FOR TENSIONING MOTION TRANSMITTING CONTROL CABLES

BACKGROUND OF THE INVENTION

1) Technical Field

The subject invention relates to a mechanical device for automatically taking-up slack in a control cable of a motion transmitting system.

2) Description of the Prior Art

Conventional take-up devices used for taking-up slack in control cables are well known in the art. For it is recognized that, in many motion transmitting control systems, it is desirable to include some form of a take-up device in relation to the control cable to take-up any slack generated in the motion transmitting system. It is understood that excessive slack in the control cable may significantly diminish the operating efficiency of the motion transmitting system.

Many conventional devices implemented to take-up slack in a control cable are deficient in that the operation of taking-up slack is not automatic. Nor is the operation of taking-up slack with these take-up devices continuous. That is to say that many conventional take-up devices do not automatically account for the tendency of the control cable in a motion transmitting system to return to a slackened position. For example, although a common turnbuckle takes-up slack in a control cable, the operation is not automatic because the turnbuckle requires manual adjustment. Furthermore, in the time interval between manual adjustment of the turnbuckle, the control cable returns to the slackened position and the operating efficiency of the motion transmitting system is diminished due to the excessive slack in the control cable. Examples of such conventional take-up devices are shown in U.S. Pat. Nos. 2,403,828, 2,813,733, and 5,702,196.

In a similar conventional manner simple extension springs in combination with a linear ratchet mechanism have been employed to take-up slack in a control cable. In such conventional devices, the extension spring takes-up slack in the control cable, and the linear ratchet mechanism performs a mechanical locking function to prevent the control cable from returning to the slackened position. However, in the time interval between increasing mechanical locks of the linear ratchet mechanism, the control cable returns to the slackened position. In sum, such locking linear ratchet mechanisms are deficient because they do not account for the control cables tendency to return to the slackened position in between increasing mechanical locks of the control cable.

Due to the inefficiencies identified in conventional take-up devices, it is desirable to implement a take-up device that automatically takes-up slack in a control cable while accounting for the continuous tendency of the control cable to return to the slackened position by preventing this return from taking place.

SUMMARY OF THE INVENTION AND ADVANTAGES

A take-up device for taking-up slack in a control cable. The take up device comprises a first cable mount for fixedly receiving one end of the control cable. A first actuator operatively engages the first cable mount for continuously biasing the first cable mount to a take-up position. A stop element selectively engages the first cable mount to retain the first cable mount in the take-up position. The take-up device is characterized by a second actuator for automatically moving the stop element into selective engagement with the first cable mount as the first actuator biases the first cable mount to the take-up position thereby automatically preventing the first cable mount from returning to a slackened position.

Accordingly, the subject invention provides a take-up device that automatically takes-up slack in a control cable while continuously, and therefore permanently, accounting for the tendency of the control cable to return to the slackened position by automatically preventing the control cable from returning to the slackened position with a stop element.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
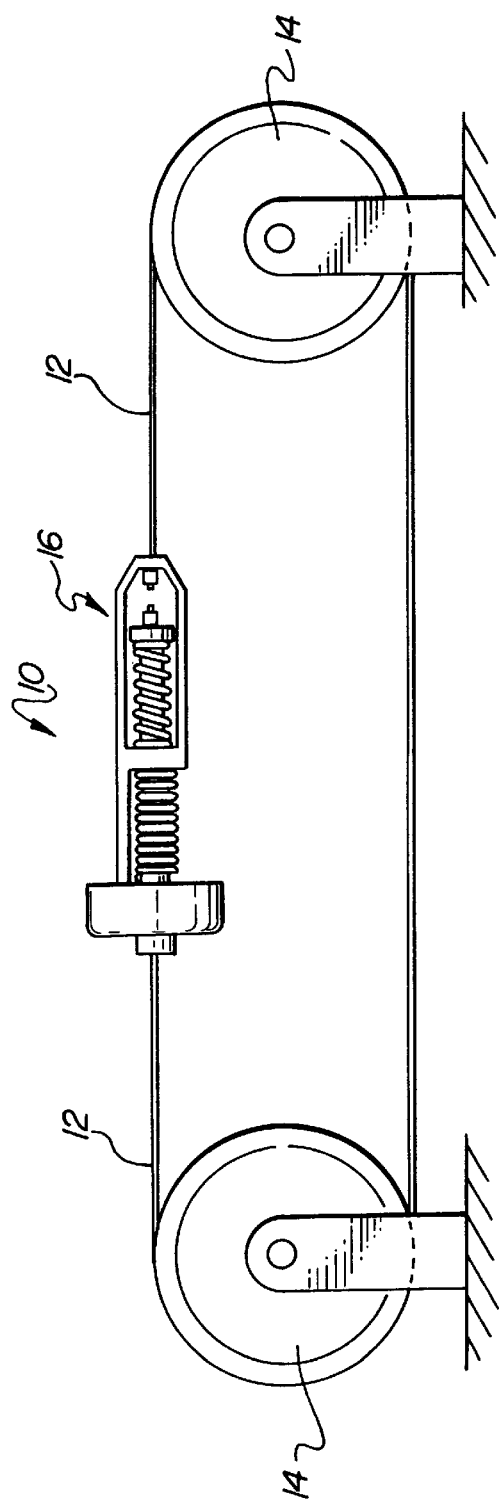
FIG. 1 is a side view of a take-up device operating in an oscillatory motion transmitting environment.

Referring to the Figures, wherein like numerals indicate like or corresponding parts throughout the several views, a motion transmitting system is generally shown at 10 in FIG. 1. The motion transmitting system 10 utilizes a control cable 12, or equivalent thereto, in cooperation with pulley mechanisms 14 to transfer motion. As relevant to the subject invention, the motion transmitting system 10 is implemented in an articulated structure of an industrial robot for manipulating motion of the industrial robot in three-dimensional space. However, the motion transmitting system 10 may be integral to various other applications. For example, in addition to the industrial robot industry, the motion transmitting system 10 may be implemented to transfer motion in the automobile and aircraft industries.

Figure 2:
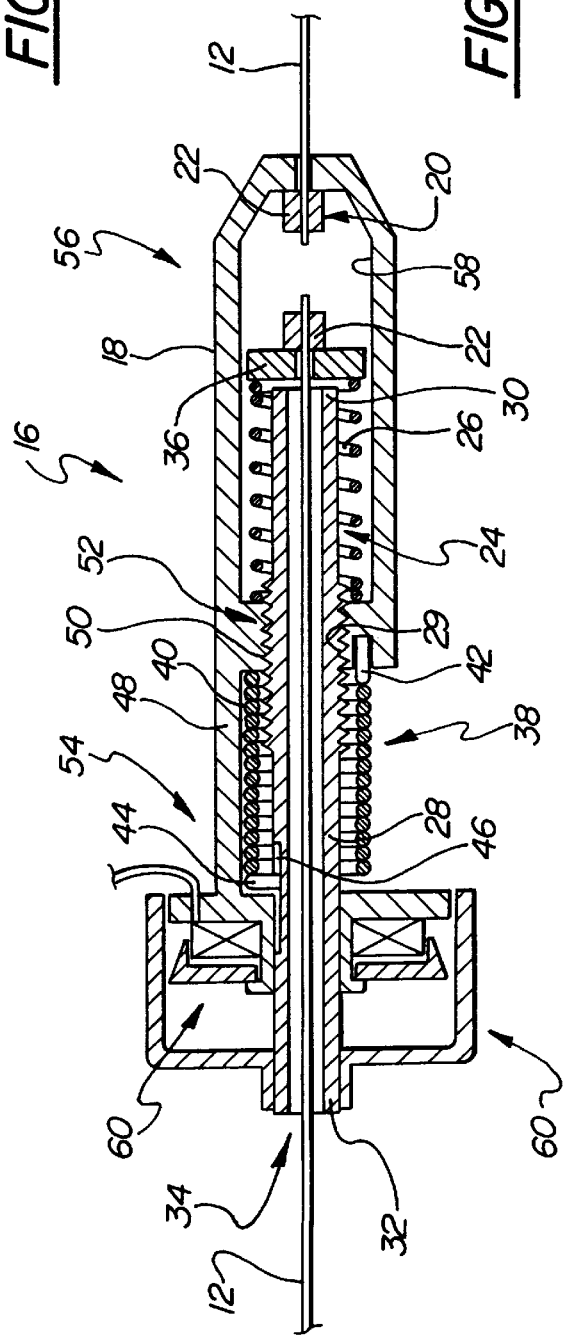
FIG. 2 is an exploded partially cross-sectional view of the take-up device in FIG. 1 showing, in particular, the relationship of a second actuator and a stop element.

Referring also to FIG. 2, the subject invention, a take-up device, is generally shown at 16. As specific to the primary embodiment, the take-up device 16 is integrally disposed between the pulley mechanisms 14 thereby accounting for limited oscillatory motion of the control cable 12. The take-up device 16 automatically eliminates slack in the control cable 12 in order to maintain maximum operating conditions of the overall motion transmitting system 10. As appreciated, excessive slack in the control cable 12 may significantly diminish the operating efficiency of the motion transmitting system 10.

Specifically, the take-up device 16 comprises a first cable mount 18 for fixedly receiving one end of the control cable 12. The take-up device 16 similarly includes a second cable mount 20 for fixedly receiving an opposing end of the control cable 12. Preferably, the first 18 and second 20 cable mounts are crimp anchors 22 which internally receive and secure each respective end of the control cable 12 in a crimp-like fashion. A first actuator 24 of the take-up device 16 operatively engages the first cable mount 18 for continuously biasing the first cable mount 18, and therefore the secured control cable 12, to a take-up position. As appreciated, the first actuator 24 is typically a compression spring 26 that axially biases the first cable mount 18 to the take-up position. As will be discussed below with particular reference to the alternative embodiments, the first actuator 24 may be of any suitable design.

The take-up device 16 further includes a stop element 28 that selectively engages the first cable mount 18 to retain the first cable mount 18 in the take-up position. Preferably, the stop element 28 is an elongated tubular member 28 having external threads 29. The stop element 28 also includes a first end 30 and a second end 32 with a bore 34 extending through the stop element 28 between the first 30 and second 32 ends for receiving the control cable 12. As noted, the stop element 28 is generally a threaded tube 28 having a bore 34 for receiving the control cable 12, however, the stop element 28 is not limited in design to the threaded tube 28 and may include any design suitable for selectively engaging the first cable mount 18. Also, a retaining washer 36 of the take-up device 16 is disposed between the first cable mount 18 and the first end 30 of the stop element 28 for axially displacing the first cable mount 18.

The take-up device 16 is characterized by a second actuator 38 for automatically moving the stop element 28 into selective engagement with the first cable mount 18 as the first actuator 24 biases the first cable mount 18 to the take-up position. As related to the subject invention, the second actuator 38 is preferably a torsion spring 40. The torsion spring 40 imparts a constant preloaded rotational force on the stop element 28. A torsion spring 40 is a simple and efficient device for imparting preloaded rotational forces on an item. However, as appreciated, the second actuator 38 may be of any design suitable for imparting a preloaded rotational force on an item.

In order to further facilitate the retention of the first cable mount 18 in the take-up position by the stop element 28, the take-up device 16 also includes a longitudinally extending core conduit member 48 that movably supports the stop element 28. The core conduit member 48 includes threads 50 to enable the movable support of the stop element 28. In the preferred embodiment, the core conduit member 48 is essentially an outer housing 48 having an internal bore 52 that forms the threads 50 of the core conduit member 48. These threads 50 allow for receipt of the threads 29 of the stop element 28 into the internal bore 52 of the core conduit member 48. The threads 29 of the stop element 28 compliment the threads 50 of the core conduit member 48 whereby the threads 50 of the core conduit member 48 continuously engage the threads 29 of the stop element 28 to provide rotation therebetween. Furthermore, the threads 50 of the core conduit member 48 and the threads 29 of the stop element 28 each include a pitch for preventing reverse rotation between the stop element 28 and the core conduit member 48 thereby retaining the stop element 28 in the take-up position. For illustrative purposes, the pitch of both the threads 50 of the core conduit member 48 and of the threads 29 of the stop element 28 are shown generally. However, the threads 29, 50 may be of any suitable pitch provided that reverse rotation between the stop element 28 and the core conduit member 48 is prevented.

The torsion spring 40 includes a first end 42 and a second end 44. The first end 42 of the torsion spring 40 is anchored to the core conduit member 48 and the second end 44 of the torsion spring 40 is anchored to the stop element 28 by a lost motion connection 46. Specifically, this lost motion connection 46 allows relative axial movement between the second end 44 of the torsion spring 40 and the stop element 28. Upon axial movement of the stop element 28 into selective engagement with the first cable mount 18, the first cable mount 18 is thereby automatically prevented from returning from the take-up position to a slackened position.

As a result of the complimentary threads 29, 50 of the stop element 28 and of the core conduit member 48, and as a result of the lost motion connection 46 between the second end 44 of the torsion spring 40 and the stop element 28, automatic axial movement of the stop element 28 relative to the core conduit member 48 is facilitated as the second actuator 38 automatically moves the stop element 28 into selective engagement with the first cable mount 18.

The core conduit member 48 also includes a first end 54 and a second end 56 where the second end 56 of the core conduit member 48 defines an encapsulating chamber 58 for integrally housing the first cable mount 18 and the first end 30 of the stop element 28. The second cable mount 20 of the take-up device 16 is connected to the encapsulating chamber 58 thereby securing the end of the control cable 12 to the take-up device 16 to allow for tensioning of the control cable 12.

The take-up device 16 as detailed in the preferred embodiment of FIGS. 1 and 2 also includes a clutch 60 for engaging the stop element 28 to prevent axial and rotational movement of the stop element 28 relative to the core conduit member 48 when the motion transmitting system 10 is operational. It shall be understood from the operation discussion below that movement of the stop element 28 of the take-up device 16 during operation of the motion transmitting system is undesirable. As appreciated, the clutch 60 may be any suitable device that engages the stop element 28 to prevent axial and rotational movement of the stop element 28 relative to the core conduit member 48.

During operation of the motion transmitting system 10, the pulley mechanisms 14 oscillate to transfer motion via the control cable 12. While the motion transmitting system 10 is operational, the clutch 60 engages the stop element 28 to prevent rotation, and therefore axial movement, of the stop element 28. This effectively disables operation of the take-up device 16. It is generally undesirable to permit axial movement of the stop element 28 during operation of the motion transmitting system 10 because permissive movement of the stop element 28 via the preloaded rotational force of the torsion spring 40 can repeatedly force the control cable 12 to the take-up position thereby increasing the preloaded tension on the control cable 12 and diminishing the overall performance of the motion transmitting system 10 due to excessive tension on the control cable 12.

However, once oscillatory motion of the pulley mechanisms 14 ceases, the clutch 60 disengages the stop element 28, and operation of the take-up device is enabled. At this point, if there is slack in the control cable 12, then the compression spring 26 automatically expands to tension the control cable 12 by axially displacing the retaining washer 36, the first cable mount 18, and ultimately the control cable 12 to the take-up position. Simultaneously, the preloaded rotational forces of the torsion spring 40 rotate the stop element 28. As a result of this rotation, the stop element 28 also moves axially to the take-up position to continuously abut the retaining washer 36 thereby preventing the retaining washer 36, the first cable mount 18, and the control cable 12 from returning to the slackened position.

Figure 3:
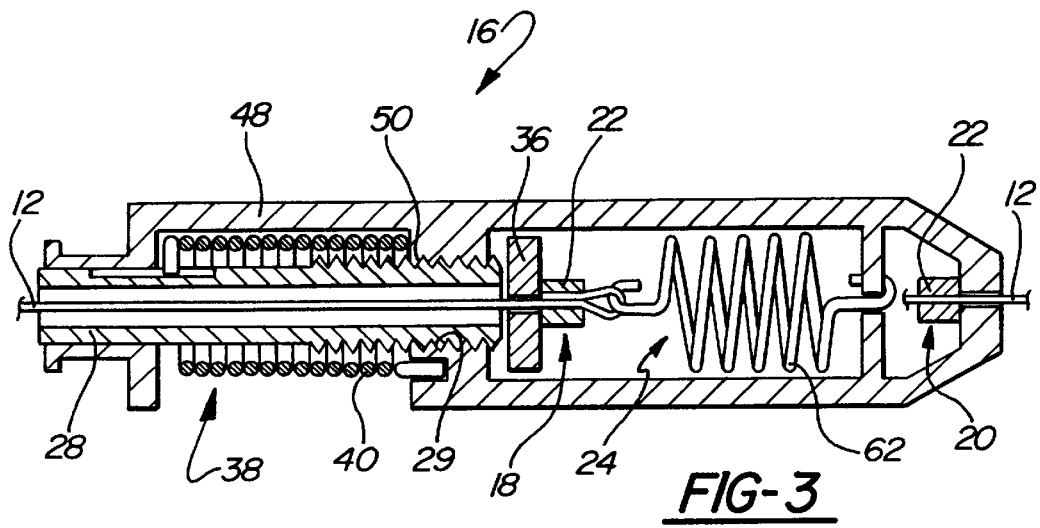
FIG. 3 is an alternative embodiment of the take-up device with a first actuator being a tension spring.
Figure 4:
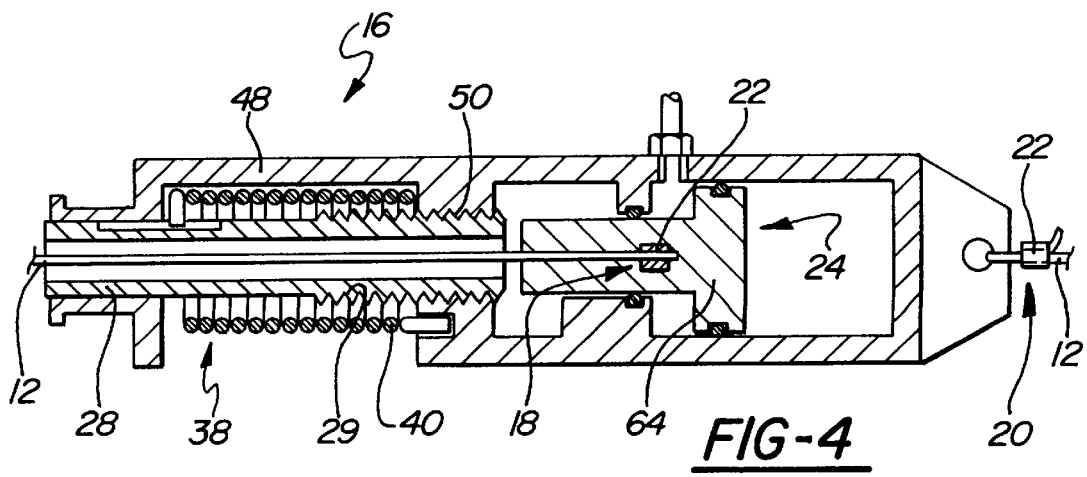
FIG. 4 is another alternative embodiment of the take-up device with the first actuator being a piston-cylinder assembly.

Referring now to FIGS. 3 and 4, wherein like numerals indicate like or corresponding parts as described above, alternative embodiments of the take-up device are generally shown at 16. As noted above, these alterative embodiments are unique in that the design of the first actuator 24 in the preferred embodiment, a compression spring 26, is replaced with other actuation devices suitable for axially biasing the first cable mount 18 to the take-up position. Also, since in the alternative embodiments of FIGS. 3 and 4, the compression spring 26 of the preferred embodiment is replaced by an alternative first actuator 26, the length of the stop element 28 has been modified to account for the unique actuation mechanism in each alternative embodiment. These alternative embodiments also include the first 18 and second 20 cable mounts, the stop element 28, and the core conduit member 48 as above in the primary embodiment. Further, the alternative embodiments in FIGS. 3 and 4 are also characterized by a second actuator 38 for automatically moving the stop element 28 into selective engagement with the first cable mount 18 as the first actuator 24 biases the first cable mount 18 to the take-up position.

More specifically, the first actuator 24 in FIG. 3 comprises a tension spring 62. In this embodiment, the tension spring 62 operatively engages the first cable mount 18 to continuously bias the first cable mount 18, and therefore the secured control cable 12, to the take-up position. Alternatively, the first actuator 24 in FIG. 4 comprises a fluid actuator 64. In this embodiment, the fluid actuator 64 operatively engages the first cable mount 18 to continuously bias the first cable mount 18, and therefore the secured control cable 12, to the take-up position. Notice that, in this embodiment, the retaining washer 36 of the preferred embodiment is eliminated, and the fluid actuator is in a direct relationship with the stop element 28. As appreciated, the fluid actuator 64 in FIG. 4 may be a pneumatic cylinder employing a gas as its operative fluid, or the fluid actuator may be a hydraulic cylinder employing a viscous liquid as its operative fluid.

Figure 5:
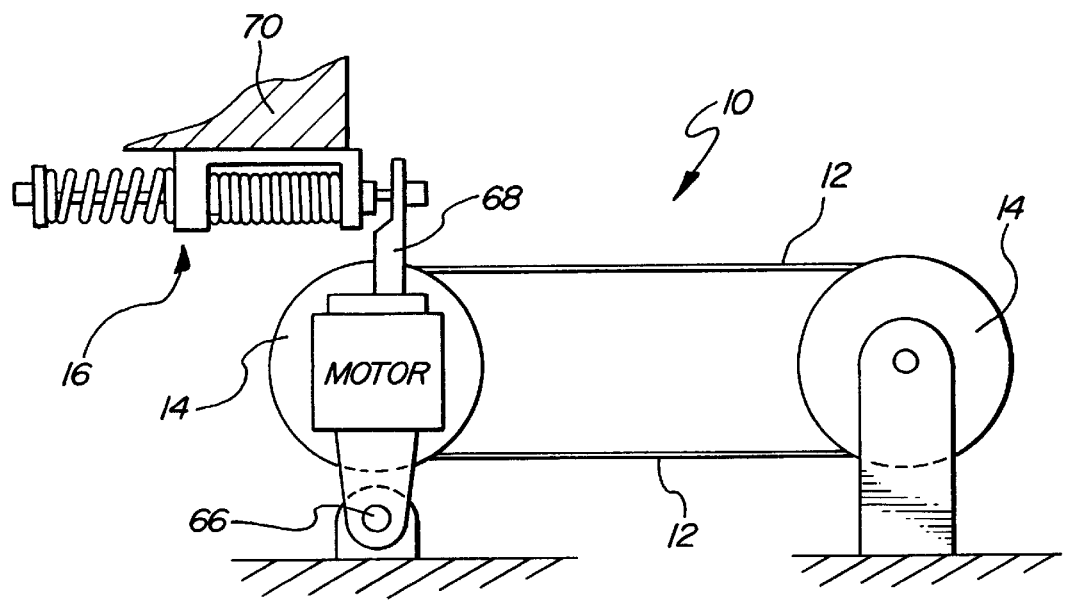
FIG. 5 is a side view of yet another alternative embodiment of the take-up device operating in a continuous motion transmitting environment.
Figure 6:
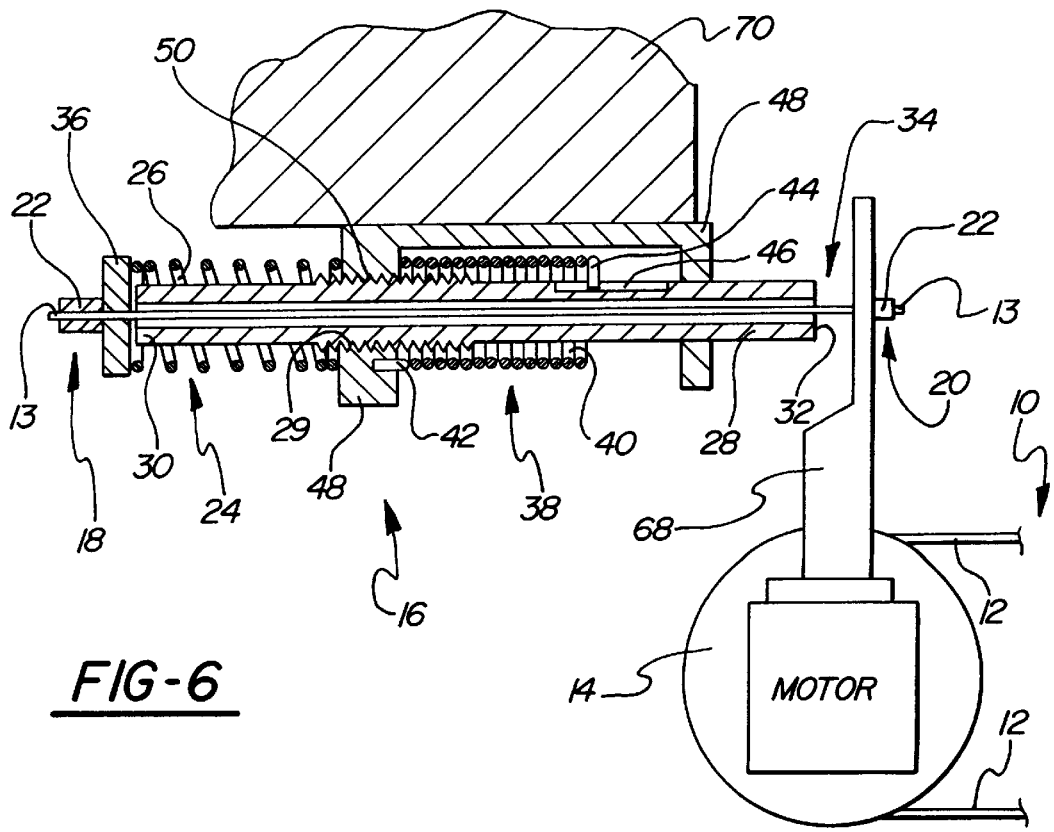
FIG. 6 is an exploded partially cross-sectional view of the take-up device in FIG. 5 showing, in particular, the relationship of the second actuator and the stop element.

Referring now to FIGS. 5 and 6, wherein like numerals indicate like or corresponding parts as described above, an alternative embodiment of the motion transmitting system is generally shown at 10 in FIG. 5. Yet another embodiment of the take-up device is generally shown at 16. Notice that the alternative embodiment of the take-up device 16 as detailed in FIGS. 5 and 6 includes many of the same components as the preferred embodiment discussed above. For instance, this alternative embodiment includes the first 18 and second 20 cable mounts, the stop element 28, and the core conduit member 48 as described above in the primary embodiment. Further, the alternative embodiment of the take-up device 16 in FIGS. 5 and 6 is also characterized by a second actuator 38 for automatically moving the stop element 28 into selective engagement with the first cable mount 18 as the first actuator 24 biases the first cable mount 18 to the take-up position.

Specific to this embodiment, the take-up device 16 is disposed independent of the pulley mechanisms 14 thereby accounting for continuous motion of the control cable 12. Despite being disposed independent of the pulley mechanisms 14, the take-up device 16 continues to automatically take-up slack in the control cable 12 in order to maintain maximum operating conditions of the overall motion transmitting system 10. To accomplish slack elimination in the control cable 12, this embodiment requires that at least one pulley mechanism 14 include a pivot 66 for allowing rotational displacement of the pulley mechanism 14 to take-up slack in the control cable 12. As appreciated, the control cable 12, as discussed in this embodiment, extends around the pulley mechanisms 14. This embodiment also includes an extension control cable 13 extending through the take-up device 16. Notice that similar to the control cable 12 that extends around the pulley mechanisms 14, the extension control cable 13 could also slacken whereby the take-up device 16 could operate to take-up the slack in the extension control cable 13.

Referring in comparison to both FIGS. 2 and 6, the core conduit member 48 as embodied in FIG. 6 does not include the first 54 and second 56 ends of the core conduit member 48 as embodied in FIG. 2. Furthermore, the core conduit member 48 as embodied in FIG. 6 also does not include the encapsulating chamber 58 of the core conduit member 48 as embodied in FIG. 2. As a result, the second cable mount 20 is no longer connected to the encapsulating chamber 58. Instead, the second cable mount 20 is disposed external to the core conduit member 48 and located adjacent to the second end 32 of the stop element 28. The second cable 20 and the first cable mount 18 receive the extension control cable 13. A support arm 68 is disposed between the second end 32 of the stop element 28 and the second cable mount 20. Also, the core conduit member 48 is rigidly supported to a ground support 70 to allow for slack take-up in the control cable 12, and also to prevent the core conduit member 48 from rotating.

If the control cable 12 in the continuous motion transmitting system 10 slackens, then the first actuator 24 expands to displace the first cable mount 18 thereby actuating the extension control cable 13, the second cable mount 20, and the support arm 68. Actuation of the support arm 68 rotationally displaces the pulley mechanism 14 via the pivot 66 thereby taking-up slack in the control cable 12 and maintaining maximum operating conditions of the overall motion transmitting system 10. Simultaneous to the expansion of the first actuator 24, the preloaded rotational forces of the torsion spring 40 rotate the stop element 28. As a result of this rotation, the stop element 28 moves axially to the take-up position to continuously abut the retaining washer 36 thereby preventing the retaining washer 36, the first cable mount 18, and the extension control cable 13 from returning to the slackened position.

Figure 7:
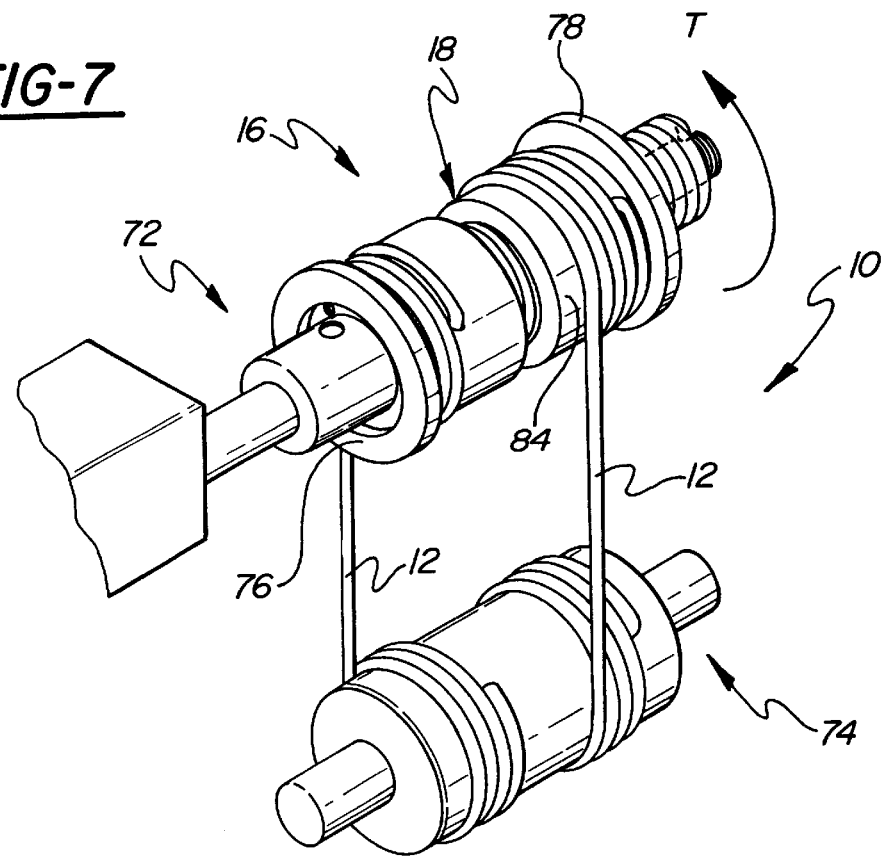
FIG. 7 is a perspective view of another alternative embodiment of the take-up device operating in a dual wire motion transmitting environment.
Figure 8:
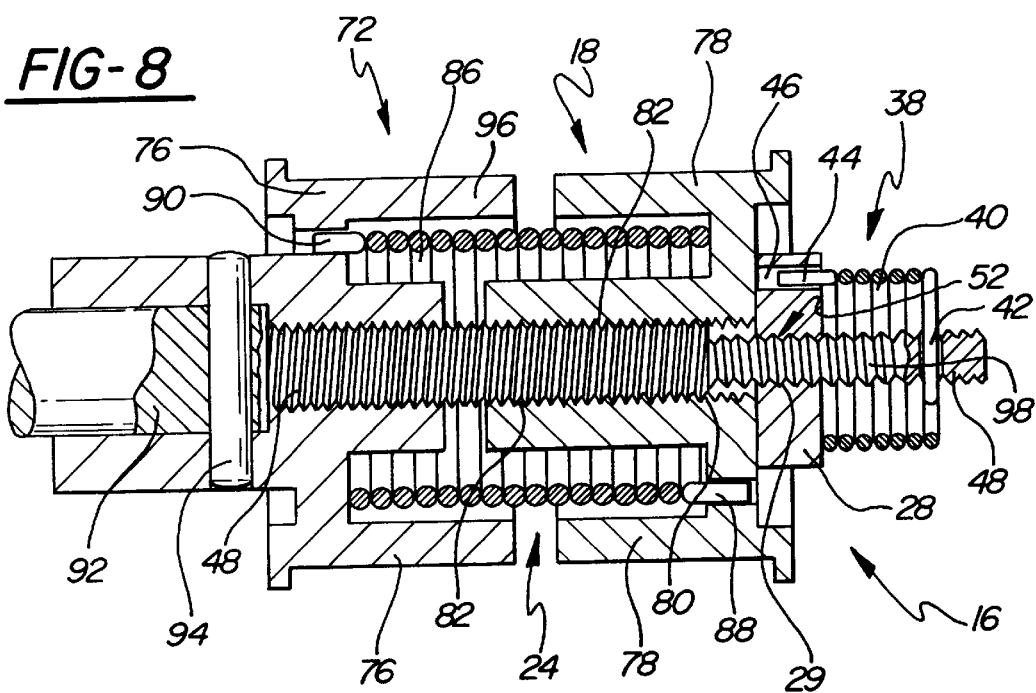
FIG. 8 is an exploded partially cross-sectional view of the take-up device in FIG. 7 showing, in particular, the relationship of the second actuator and the stop element.

Referring now to FIGS. 7 and 8, wherein like numerals indicate like or corresponding parts as described above, yet another alternative embodiment of the motion transmitting system is generally shown at 10 in FIG. 7. In particular, this embodiment employs interrelated dual control cables 12 to transfer motion. The motion transmitting system 10 in FIG. 7 specifically includes a mechanically engaged driver pulley 72 and a freely rotational driven pulley 74.

Referring to FIG. 8, another alternative embodiment of the take-up device is shown in detail at 16. The driver pulley 72 includes both a motorized pulley 76 and the first cable mount 18 operating as a cylindrical pulley 78. In particular, the cylindrical pulley 78 includes an interior bore 80 rotationally supported on the core conduit member 48. The interior bore 80 of the cylindrical pulley 78 includes threads 82. The take-up device 16, as embodied in FIG. 8, includes the first cable mount 18, the first actuator 24, the stop element 28, the second actuator 38, and the core conduit member 48 as described in the primary embodiment in FIGS. 1 and 2 above. However, as relevant to this embodiment, there are several particularities that require further description.

First, in this alternative embodiment, the first cable mount 18 externally receives one end of the control cable 12 on an external surface 84 of the first cable mount 18. Secondly, the first actuator 24 is a torsion spring 86 having a first end 88 and a second end 90. The first end 88 of the torsion spring 86 is anchored to the first cable mount 18 and the second end 90 of the torsion spring 86 is anchored to the motorized pulley 76. The torsion spring 86, as it relates to the first cable mount 18, imparts a constant preloaded rotational force on the first cable mount 18 thereby constantly biasing the first cable mount 18 to the take-up position T. Thirdly, the stop element 28 is a retaining nut 28 having a threaded internal bore 52 for providing rotational and axial movement of the stop element 28 relative to the core conduit member 48. Fourthly, the core conduit member 48 is shaped as a threaded shaft 48 having a head portion 92. The threaded shaft extends longitudinally through the motorized pulley 76, the first cable mount 18, and the stop element 28. A locking pin 94 extends through both the motorized pulley 76 and the head portion 92 of the threaded shaft 48 for fixedly securing the threaded shaft 48 within the take-up device 16. The motorized pulley 76 is also fixedly secured, and therefore non-rotational, via the locking pin 94. More specifically, the core conduit member 48 includes a first threaded section 96 movably supporting the first cable mount 18 and a second threaded section 98 movably supporting the stop element 28. The first threaded section 96 includes a first diameter and the second threaded section 98 includes a second diameter where the diameter of the first threaded section is greater than the diameter of the second threaded section. However, as appreciated, the core conduit member 48 may be of a consistent diameter. Finally, as described above in the primary embodiment, the second actuator 38 is also a torsion spring 40 having a first end 42 and a second end 44 with the first end 42 being anchored to the core conduit member 48 and the second end 44 being anchored to the stop element 28.

The alternative embodiment in FIGS. 7 and 8 is also characterized by a second actuator 38 for automatically moving the stop element 28 into selective engagement with the first cable mount 18 as the first actuator 24 biases the first cable mount 18 to the take-up position T.

During operation of this alternative embodiment, if there is slack in the control cable 12 that is directly associated with the cylindrical pulley 78, then the cylindrical pulley 78, and therefore the attached control cable 12, rotate to the take-up position T due to the constant preloaded rotational force imparted on the cylindrical pulley 78 by the torsion spring 86. As the cylindrical pulley 78 is biased toward the take-up position T, the cylindrical pulley 78 moves axially along the first threaded section 96 of the core conduit member 48 toward the fixed motorized pulley 76. Simultaneously, the preloaded rotational forces of the second actuator 38, a torsion spring 40, automatically rotate the stop element 28 along the core conduit member 48. As a result of this rotation, the stop element 28 also moves axially along the core conduit member 48 to continuously abut the cylindrical pulley 78 thereby preventing the cylindrical pulley 78 and the control cable 12 from returning to the slackened position. When the control cable 12 that is directly associated with the cylindrical pulley 78 is tensioned, the freely rotational driven pulley 74 rotates to automatically tensions the control cable 12 that is directly associated with the motorized pulley 78.

Figure 9:
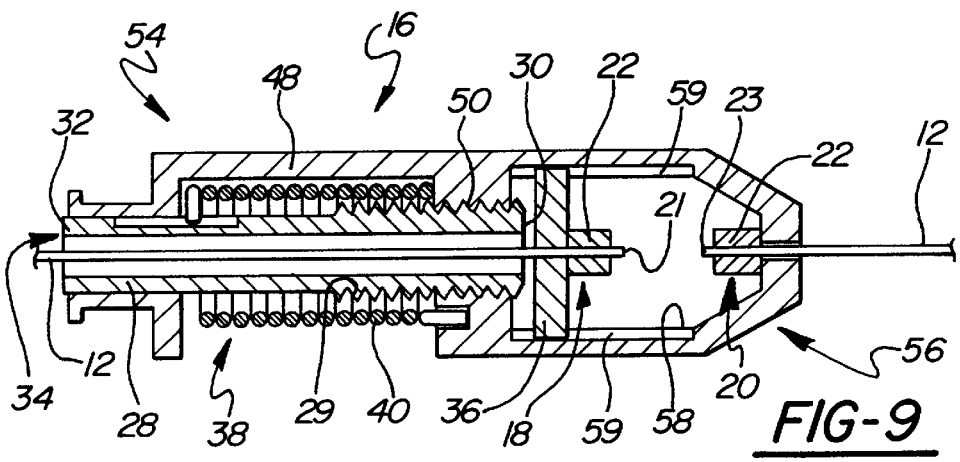
FIG. 9 is yet another alternative embodiment of the take-up device wherein the first actuator is eliminated.

Referring now to FIG. 9, wherein like numerals indicate like or corresponding parts as described above, yet another alternative embodiment of the take-up device is generally shown at 16. This alternative embodiment includes the first 18 and second 20 cable mounts, the stop element 28, the retaining washer 36, and the core conduit member 48 as described in the primary embodiment in FIGS. 1 and 2 above. In addition, this embodiment of the take-up device 16 is characterized by including an actuator 38 for automatically effecting the relative rotation between the stop element 28 and the core conduit member 48 to automatically move the first 18 and second 20 cable mounts axially relative to one another. As appreciated, the actuator 38 of this embodiment correlates to the second actuator 38, a torsion spring 40, of the preferred embodiment.

Specific to this alternative embodiment, the first actuator 24 of the take-up device 16, as described above in FIGS. 1 and 2 is eliminated. Due to the elimination of the first actuator 24, the second actuator 38, which is a torsion spring 40 as detailed above, must have sufficient preloaded strength to accomplish two operations. First, the torsion spring 40 must have sufficient strength to displace the retaining washer 36 and the first cable mount 18 thereby taking-up slack in the control cable 12. Secondly, the torsion spring 40 must have sufficient strength to then automatically rotate the stop element 28 so that the stop element 28 continuously abuts the retaining washer 36 and the first cable mount 18 to prevent the control cable 12 from returning to the slackened position.

Furthermore, the encapsulating chamber 58 of the core conduit member 48 has internal slots 59 for receiving the retaining washer 36. In this embodiment, the retaining washer 36 has notches (not numbered). The notches of the retaining washer 36 are key locked in the internal slots 59 of the encapsulating chamber 58 for preventing undesirable rotation of the retaining washer 36 relative to the encapsulating chamber 58 in response to any rotational forces imparted on the retaining washer 36 due to its relationship with the stop element 28.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that within the scope of the appended claims the invention may be practiced otherwise than as specifically described.

What is claimed is:

1. An assembly for automatically taking-up slack in a cable, said assembly comprising:

a first cable mount for fixedly receiving one end of the cable;

a first actuator operatively engaging said cable mount for continuously biasing said cable mount to a take-up position;

a stop element selectively engaging said cable mount to retain said cable mount in said take-up position;

said assembly characterized by a second actuator operatively connected to said stop element, said second actuator automatically moving said stop element into said selective engagement with said cable mount as said first actuator biases said cable mount to said take-up position thereby automatically preventing said cable mount from returning to a slackened position.

2. An assembly as set forth in claim 1 further including a longitudinally extending core conduit member movably supporting said stop element.

3. An assembly as set forth in claim 2 wherein said second actuator comprises a torsion spring.

4. An assembly as set forth in claim 3 wherein said torsion spring has first and second ends, said first end anchored to said core conduit member and said second end anchored to said stop element.

5. An assembly as set forth in claim 4 wherein said second end of said torsion spring is connected to said stop element by a lost motion connection for allowing relative axial movement between said second end of said torsion spring and said stop element.

6. An assembly as set forth in claim 5 wherein said stop element moves axially relative to said core conduit member.

7. An assembly as set forth in claim 3 wherein said first actuator comprises a compression spring.

8. An assembly as set forth in claim 3 wherein said first actuator comprises a tension spring.

9. An assembly as set forth in claim 3 wherein said first actuator comprises a fluid actuator.

10. An assembly as set forth in claim 3 wherein said first actuator comprises a torsion spring.

11. An assembly as set forth in claim 2 wherein said core conduit member includes threads in continuous engagement with said stop element for providing rotation therebetween.

12. An assembly as set forth in claim 11 wherein said stop element includes threads for facilitating said automatic movement of said stop element relative to said core conduit member thereby promoting said selective engagement of said stop element with said cable mount.

13. An assembly as set forth in claim 12 wherein said threads of said core conduit member and said threads of said stop element each include a fine pitch for preventing reverse rotation between said stop element and said core conduit member thereby retaining said stop element in said take-up position.

14. An assembly as set forth in claim 13 wherein said stop element includes first and second ends with a bore extending through said stop element between said first and second ends.

15. An assembly as set forth in claim 14 wherein said bore of said stop element receives the cable.

16. An assembly as set forth in claim 14 further including a retaining washer disposed between said first cable mount and said first end of said stop element for axially displacing said cable mount.

17. An assembly as set forth in claim 16 further including a clutch for engaging said stop element and preventing rotation of said stop element relative to said core conduit member.

18. An assembly as set forth in claim 17 wherein said clutch prevents axial movement of said stop element relative to said core conduit member.

19. An assembly as set forth in claim 12 wherein said core conduit member is an outer housing having an internal bore forming said threads of said core conduit member for threadingly receiving said stop element.

20. An assembly as set forth in claim 19 wherein said stop element is an elongated tubular member having external threads for threadingly engaging said outer housing.

21. An assembly as set forth in claim 16 wherein said core conduit member includes a first end and a second end, said second end defining an encapsulating chamber for integrally housing said first cable mount and said first end of said stop element.

22. An assembly as set forth in claim 21 further including a second cable mount for fixedly securing the other end of the cable to said encapsulating chamber.

23. An assembly as set forth in claim 22 wherein said first and second cable mounts are crimp anchors for fixedly receiving opposing ends of the cable.

24. An assembly as set forth in claim 22 including a support arm disposed between said second end of said stop element and said second cable mount wherein movement of the cable actuates said support arm.

25. An assembly as set forth in claim 24 further including a ground support for rigidly supporting said core conduit member.

26. An assembly as set forth in claim 12 wherein said core conduit member is a threaded shaft extending longitudinally through said first cable mount and said stop element.

27. An assembly as set forth in claim 26 wherein said core conduit member includes a first threaded section movably supporting said first cable mount and a second threaded section movably supporting said stop element.

28. An assembly as set forth in claim 27 wherein said first threaded section includes a first diameter and said second threaded section includes a second diameter, said first diameter being greater than said second diameter.

29. An assembly as set forth in claim 2 wherein said first cable mount is a cylindrical pulley having an interior bore rotationally supported on said core conduit member.

30. An assembly as set forth in claim 29 wherein said interior bore of said cylindrical pulley includes threads.

31. An assembly as set forth in claim 30 wherein said stop element is a retaining nut having a threaded internal bore for providing rotational and axial movement relative to said core conduit member.

32. An assembly for automatically taking-up slack in a cable, said assembly comprising:

a first cable mount for attachment to a first end of the cable;

a second cable mount for attachment to a second end of the cable;

a stop element selectively engaging said first cable mount, and a core conduit member threadingly engaging said stop element to allow axial movement of said stop element relative to said core conduit member upon relative rotation between said stop element and said core conduit member when said first and second cable mounts move relative to one another into a take-up position;

said assembly characterized by further including an actuator operatively connected to said stop element, said actuator automatically effecting said relative rotation between said stop element and said core conduit member to automatically move said cable mounts axially relative to one another.

33. An assembly as set forth in claim 32 further including a retaining washer disposed between said first cable mount and said stop element for axially displacing said first cable mount.

34. An assembly as set forth in claim 33 wherein said core conduit member includes a first end and a second end, said second end defining an encapsulating chamber for integrally housing said retaining washer.

35. An assembly as set forth in claim 34 wherein said retaining washer is keyed to said encapsulating chamber for preventing rotation of said retaining washer relative to said encapsulating chamber.

36. An assembly as set forth in claim 32 wherein said actuator comprises a torsion spring.

* * * * *